B. F. ADAMS.
Combined Stirrer and Thermometer.
No. 233,906. Patented Nov. 2, 1880.
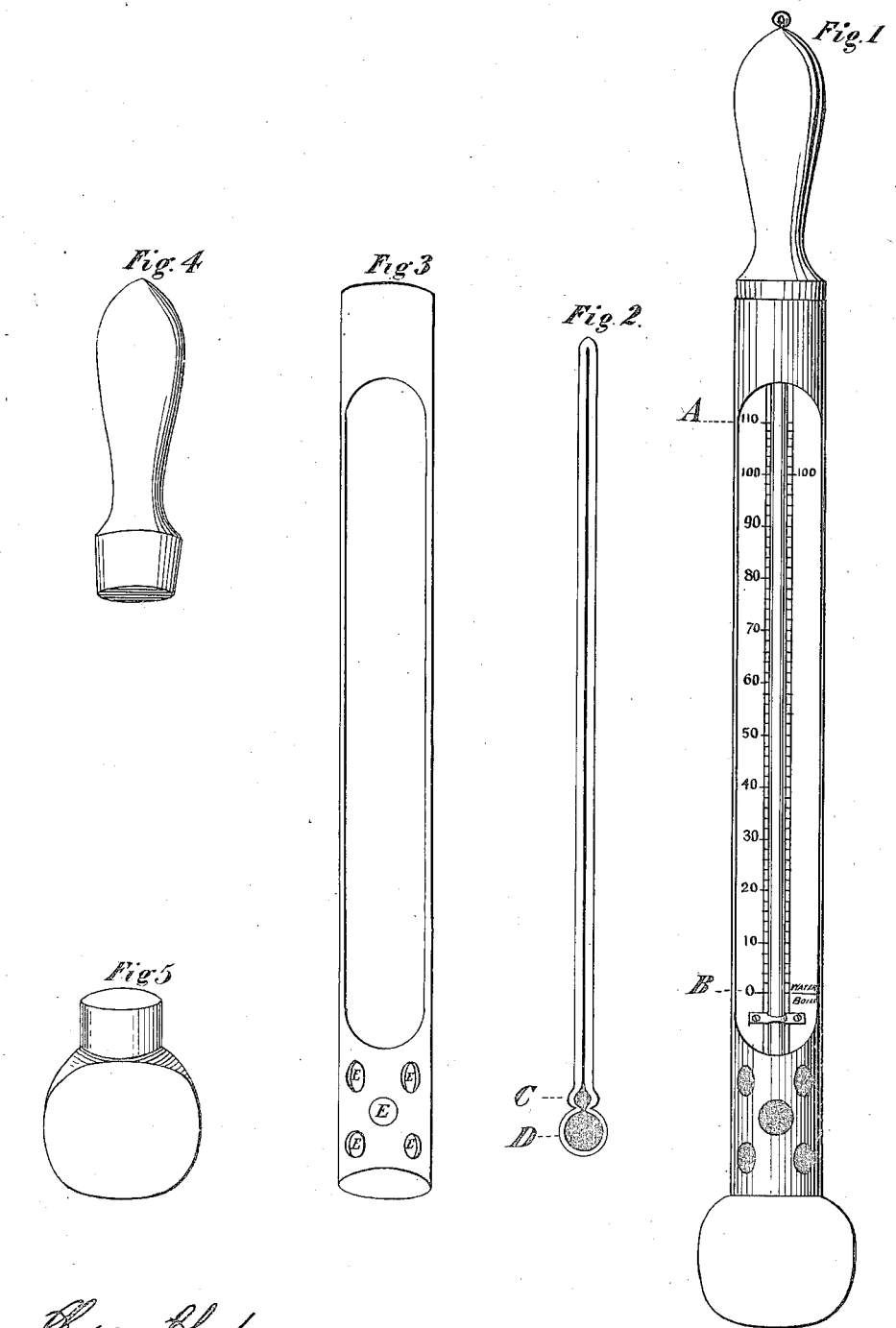

UNITED STATES PATENT OFFICE.

BENJAMIN F. ADAMS, OF BROOKLYN, NEW YORK.

COMBINED STIRRER AND THERMOMETER.

SPECIFICATION forming part of Letters Patent No. 233,906, dated November 2, 1880.

Application filed January 27, 1880.

*To all whom it may concern:*

Be it known that I, BENJAMIN F. ADAMS, of Brooklyn, in the county of Kings and State of New York, have invented certain new and useful Improvements in Thermometers; and I do hereby declare that the following is a full, clear, and exact description of the same.

My invention relates to a thermometer; and it is particularly adapted for use in the cooking of sugar for making confectionery, but it may also be employed in oil-boiling processes.

In the manufacture of confectionery the various kinds and qualities require different degrees of temperature—in some cases as high as 120° above the point at which water boils, or 330° above zero in the scale of the Fahrenheit thermometer. During the cooking process it is necessary for the attendant to stir the liquid continually to prevent it from burning, and also to observe the temperature of the same. It has heretofore been customary to use one hand for holding the stirring spoon or spatula, and the other hand for holding a Fahrenheit thermometer in the liquid.

Among confectioners, in referring to the degrees of heat to which certain liquids are to be brought, it is customary to refer to the number of degrees above the water-boil point, rather than to the number of degrees marked on the Fahrenheit scale. For example, a confectioner will use the words "40° above water-boil" rather than the words "252° Fahrenheit," for the reason that the thermometer is not used until the liquid has reached the point at which water boils, and it is known that each particular kind of sirup is to be heated to a certain number of degrees above the water-boil point.

The object of my invention is to furnish an article by which the disadvantages of the old method employed by confectioners are overcome.

To this end my invention consists, essentially, in an instrument combining a thermometer and a stirring device in one article, as hereinafter particularly set forth.

In the accompanying drawings, Figure 1 represents a view of a complete thermometer embodying my improvement. Fig. 2 is a view of the glass tube containing the mercury. Fig. 3 is a view of a casing for inclosing the tube and scale. Fig. 4 is a view of a wooden handle for the upper end of the casing. Fig. 5 is a view of a spatula carried by the lower end of the casing.

A B represents my improved scale. Unlike other thermometer-scales, this scale starts from the point at which water boils, and is graduated from that point upward to the extent of 120°, or more, if desired. By the use of this scale the confectioner is saved the trouble of calculating the difference between 212° Fahrenheit scale and the number of degrees beyond the water-boil point which it is desired to reach. The advantage of having the water-boil or 212° Fahrenheit as zero in this scale will be readily seen when it is remembered that said water-boil point is the only absolutely positive and correct point that could be used as a starting-point for the purposes for which this instrument is employed.

Fig. 2 is a detail view of my improved tube. D is the bulb, and C is a chamber immediately above it. This chamber serves two purposes: First, it forms a receptacle in which the mercury can expand before reaching the boiling-point; and, second, the mercury recedes into said receptacle, and is enabled to cohere and thus prevent the division of the column into sections, as sometimes happens in ordinary thermometers.

The tube is attached to the scale, and both are secured to a semi-cylindrical bar of wood, which is then inserted in the casing represented in Fig. 3. This casing consists of a piece of tubing, of brass or other suitable metal, of cylindrical form, with a portion cut out of sufficient size to display the mercury-tube and scale. Near the lower end of the casing, in the portion surrounding the bulb D and chamber C, perforations E are provided for the purpose of allowing the liquid to have free access to the bulb. The tube, scale, and wooden bar are secured in place in the casing by screws or other suitable means. A wooden spatula (see Fig. 5) is attached to the lower end of the casing, and a wooden handle (see Fig. 4) to the upper end. These parts are provided with plugs for insertion in the casing, and secured in place by screws, or otherwise.

The parts being thus attached together an instrument is produced which is readily used with one hand, and is at once a stirring device and a thermometer. The wooden handle, being a non-conductor, allows the instrument to be used without burning the hand, and the wooden spatula, being also a non-conductor, prevents the intense heat from the metal of the kettle from being conducted directly to the bulb.

Having thus described my invention, what I claim as new, and desire to secure by Letters Patent, is—

As an improved article of manufacture, exclusively for boiling purposes, a combined thermometer and stirring device, constructed substantially as and for the purpose herein described.

BENJAMIN F. ADAMS.

Witnesses:
 EZRA E. HOPKINS,
 CLARA CHAPMAN.